Sept. 6, 1938.　　　　E. BLOSSFELD　　　　2,129,400
BELT
Filed Aug. 4, 1937
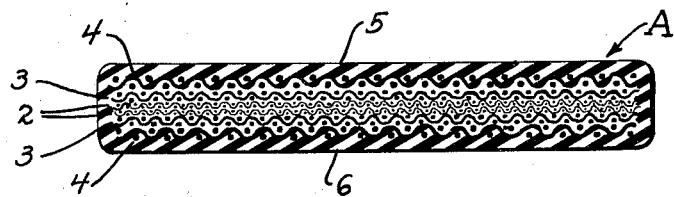
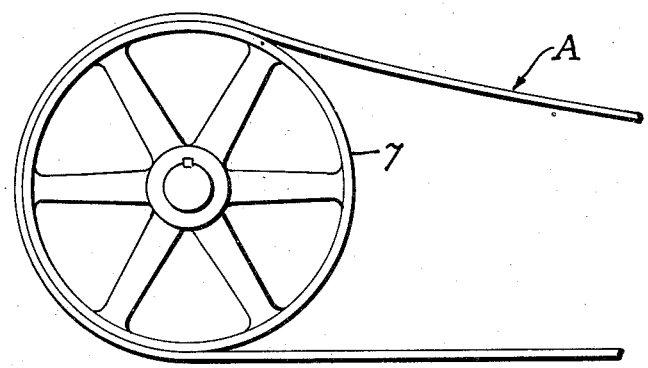
INVENTOR.
Emil Blossfeld.
BY Chas. E. Townsend.
ATTORNEY.

Patented Sept. 6, 1938

2,129,400

UNITED STATES PATENT OFFICE 2,129,400

BELT

Emil Blossfeld, Oakland, Calif.

Application August 4, 1937, Serial No. 157,349

2 Claims. (Cl. 74—232)

This invention relates to belting, and especially to that type of belting known as rubber belting, that is, belting which is constructed of superimposed layers or plies of canvas impregnated with rubber and vulcanized with relation to each other.

The art of making belts of this character for power transmission which are constructed of superimposed layers of canvas impregnated with rubber and vulcanized with relation to each other is very old. Even so, the art has progressed or improved very little, as such belts are subject to the plies separating or cracking. The separation and cracking of the plies is, according to my observation, due to alternating strains such as stretching or compression of the outer and inner layers of the belt when passing over pulleys, which is then followed by straightening of the belt when passing between the pulleys.

The object of the present invention is to generally improve the construction and operation of belts of this character and, more specifically stated, to construct a multi-ply fabric belt in which the center plies will be closely woven and of sufficient strength to take the major portion of the strain or pull to which the belt is subjected, while the outer and inner layers of the belt will be made of a coarser, less tightly woven fabric to permit free expansion and stretch of the outer surface of the belt when rounding a pulley and at the same time permit contraction and compression of the innermost layers in contact with the face of the pulley, thereby preventing the plies from separating and cracking and very materially increasing the life and durability of the belt.

The manner in which the belt is constructed is shown by way of illustration in the accompanying drawing in which—

Fig. 1 is a cross-section of the belt; and

Fig. 2 is a side elevation showing the belt passing around a pulley.

Referring to the drawing in detail, and particularly Fig. 1, A indicates in general a belt which is constructed of multi-ply layers of canvas or like fabric such as indicated at 2—2, 3—3 and 4—4. All the plies or layers are impregnated with rubber and vulcanized with relation to each other, and the upper and lower faces of the belt are covered with rubber, as indicated at 5 and 6, in the usual manner. The center or innermost plies 2—2 are in this instance made of a closely woven, comparatively thin fabric of sufficient strength to take the major portion of the load or pull to which the belt is subjected. The next layers, as indicated at 3—3, are made of a coarser woven fabric, and the outer layers 4—4 of a still coarser fabric. While the innermost layers will carry the major portion of the load or pull, a portion of the load will also be taken by the layers 3—3 and 4—4.

A belt constructed in this manner, and passing around a pulley such as shown at 7, Fig. 2, permits coarse fabric layers in contact with the face of the pulley to compress and contract and at the same time permits the coarse fabric forming the outer face of the belt as it rounds the pulley to expand and stretch without injury to the belt. A belt of this kind is reversible, as both faces have the same characteristics. Separation and cracking of the plies is entirely overcome, and the life and durability of the belt is very materially improved.

While a six-ply belt is shown, it is obvious that more or less plies may be employed, the main feature being that the innermost layers of the belt must be finely woven and strong, and that the outer layers covering the same must be coarser and coarser to permit compression or stretching as the case may be.

While these and other features of the present invention have been more or less specifically described and illustrated, I wish it understood that various changes may be resorted to within the scope of the appended claims, and the materials and finish of the several parts employed may be such as the judgment and experience of the manufacturer may dictate or other conditions may demand.

Having thus described my invention, what I claim and desire to secure by Letters Patent is—

1. A power transmission belt composed of two center plies of fabric which are closely woven and thin but of sufficient strength to take the major load or pull to which the belt is subject, a plurality of plies of fabric disposed on opposite sides of the center plies, said plies being of gradually increasingly coarsely woven and thicker fabric, with the coarsest fabric on the exterior, a vulcanized rubber binder securing the plies with relation to each other, and a rubber covering on the opposite faces of the belt.

2. A power transmission belt composed of a center portion of fabric which is closely woven and thin, but of sufficient strength to take the major load or pull to which the belt is subject, a plurality of plies of fabric disposed on opposite sides of the center plies, said plies being of gradually increasingly coarsely woven and thicker fabric, with the coarsest fabric on the exterior, a vulcanized rubber binder securing the plies with relation to each other, and a rubber covering on the opposite faces of the belt.

EMIL BLOSSFELD.